(12) United States Patent
Frea et al.

(10) Patent No.: US 11,700,859 B2
(45) Date of Patent: Jul. 18, 2023

(54) PIZZA SAUCE APPLICATOR

(71) Applicant: Edge Exponential LLC, Gahanna, OH (US)

(72) Inventors: Hayden Frea, Columbus, OH (US); James E. Grote, Columbus, OH (US)

(73) Assignee: Edge Exponential LLC, Gahanna, OH (US)

( * ) Notice: Subject to any disclaimer, the term of this patent is extended or adjusted under 35 U.S.C. 154(b) by 210 days.

(21) Appl. No.: 17/126,643

(22) Filed: Dec. 18, 2020

(65) Prior Publication Data

US 2021/0186034 A1   Jun. 24, 2021

Related U.S. Application Data

(60) Provisional application No. 62/949,804, filed on Dec. 18, 2019.

(51) Int. Cl.
| | |
|---|---|
| *A21C 9/04* | (2006.01) |
| *A21D 13/41* | (2017.01) |
| *A23P 20/10* | (2016.01) |
| *B05C 13/00* | (2006.01) |
| *B05C 5/02* | (2006.01) |

(52) U.S. Cl.
CPC .............. *A21C 9/04* (2013.01); *A21D 13/41* (2017.01); *A23P 20/10* (2016.08); *B05C 5/027* (2013.01); *B05C 13/00* (2013.01)

(58) Field of Classification Search
CPC ........... A21C 9/04; A21C 9/08; A21C 15/002; A23G 1/20; A23G 3/20; A23G 3/2023; B05C 5/027; B05C 13/00
USPC .............................. 99/450.1; 118/13, 24, 25
See application file for complete search history.

(56) References Cited

U.S. PATENT DOCUMENTS

| | | | |
|---|---|---|---|
| 3,751,198 A |  | 8/1973 | Tanara |
| 4,173,942 A | * | 11/1979 | Plattner ..................... A21B 7/00 |
| | | | 118/500 |
| 5,540,943 A | * | 7/1996 | Naramura ................ A21C 9/04 |
| | | | 426/231 |
| 6,892,629 B2 |  | 5/2005 | Tuyls et al. |
| 6,892,901 B2 |  | 5/2005 | Tuyls et al. |
| 6,969,015 B1 |  | 11/2005 | Salmela |
| 7,074,277 B2 |  | 7/2006 | Tuyls et al. |

(Continued)

OTHER PUBLICATIONS

Puzant et al, KR20000029544, English translation included, published May 25, 2000 (Year: 2000).*

*Primary Examiner* — Laura Edwards
(74) *Attorney, Agent, or Firm* — Jason H. Foster; Kremblas & Foster

(57) ABSTRACT

A pizza saucer having a housing in which components may be mounted. The housing includes a base having an upwardly facing deck, a neck that extends from the base to a head, and a manifold mounted to the head facing the deck. The housing contains at least one pump to convey pizza sauce from a source to the manifold, and a computer that controls a rotary prime mover in the base with a driveshaft extending through the deck to a tray drivingly linked to the driveshaft. An input, such as a touchscreen, is mounted to the head and faces the user during operation. With the touchscreen, the user may input the crust size. The computer actuates the pumps and the rotary prime mover, simultaneously causing the crust to rotate 360-370 degrees and the manifold to dispense sauce onto the crust until the crust is coated.

7 Claims, 14 Drawing Sheets

(56) References Cited

U.S. PATENT DOCUMENTS 7,993,049 B2     8/2011   Tuyls et al.
2013/0084373 A1*   4/2013   Linck .................... A23L 23/00
                                                 426/531

\* cited by examiner

PIZZA SAUCE APPLICATOR

BACKGROUND OF THE INVENTION

In many pizza styles, pizza sauce, which may be a liquid, a paste or in any other fluent form, is placed on a raw, or pre-baked, crust while the pizza is being assembled. The act of applying sauce to a crust is referred to as "saucing," and this step is typically carried out prior to applying solid toppings, which may include cheese, pepperoni, onions and others, to the crust. Once the sauce and toppings are applied, the pizza is normally baked in an oven and then consumed. A small portion of crust around the periphery of the pizza may be neither sauced nor topped in order that the consumer can grasp at least the edge portion of the cooked pieces of pizza without touching the sauce or toppings. This requires precision in saucing.

The faster pizza crusts are sauced the more profitable the business. Although pizza crusts have been sauced by hand for many years, this is a relatively slow process, the quantities used may be inconsistent, and it requires skill and experience to do it rapidly and consistently. Machines have been developed to more rapidly and consistently sauce pizza crusts, but this is a difficult process for machines to perform well for various reasons. Circular pizza crusts are especially difficult to sauce because of their shape, and so a machine that can quickly and consistently sauce a circular crust would be widely sought after.

BRIEF SUMMARY OF THE INVENTION

The machine and method described herein are for use with pizza sauce or any fluent material, including powders, pellets, liquids, slurries, and pastes. The machine applies sauce to a pizza crust rapidly and in measured quantities. This is accomplished by placing the crust in a pan on a rotatable tray, inputting data to a central computer regarding the size of the crust, and then actuating the machine to operate. The machine's computer may control the rotation of the tray, thereby controlling the speed and degree of rotation, along with the dispensing of sauce onto the crust during rotation.

In a preferred embodiment, one or more of multiple pumps may be actuated by the computer, based on the size of the crust, to impel sauce to a manifold and onto the crust. The manifold has passages through it that the sauce is impelled through. A manifold may have one or more inlets that are connected to one or more outlets, where the inlets receive sauce from the pumps and the outlets dispense sauce to the crust. The inlets and outlets may all be in fluid communication, or they may be separated into groups in selective fluid communication so that an operator may control which outlets are in fluid communication with inlets and thereby determine the number of outlets that will dispense sauce. The inlets and outlets may be selectively separated for a period of time. In this manner, crusts of different diameter may be sauced by the same apparatus, for example by actuating the computer to dispense onto a crust of a particular size, and then actuating the computer to dispense sauce onto a crust of a different size. Control over the number of outlets that dispense sauce may be by any means, and some examples are disclosed herein.

The tray upon which a crust in a rigid pan rests may have structures that accommodate various pan diameters, and these may include a stair-step shape. However, other structures may be used that receive a circular or other pan. Upon resting the pan on the tray within the structures that evenly retain the pan during rotation, the pan is securely fixed so that it does not move substantially radially relative to the tray during rotation.

Figure 1:
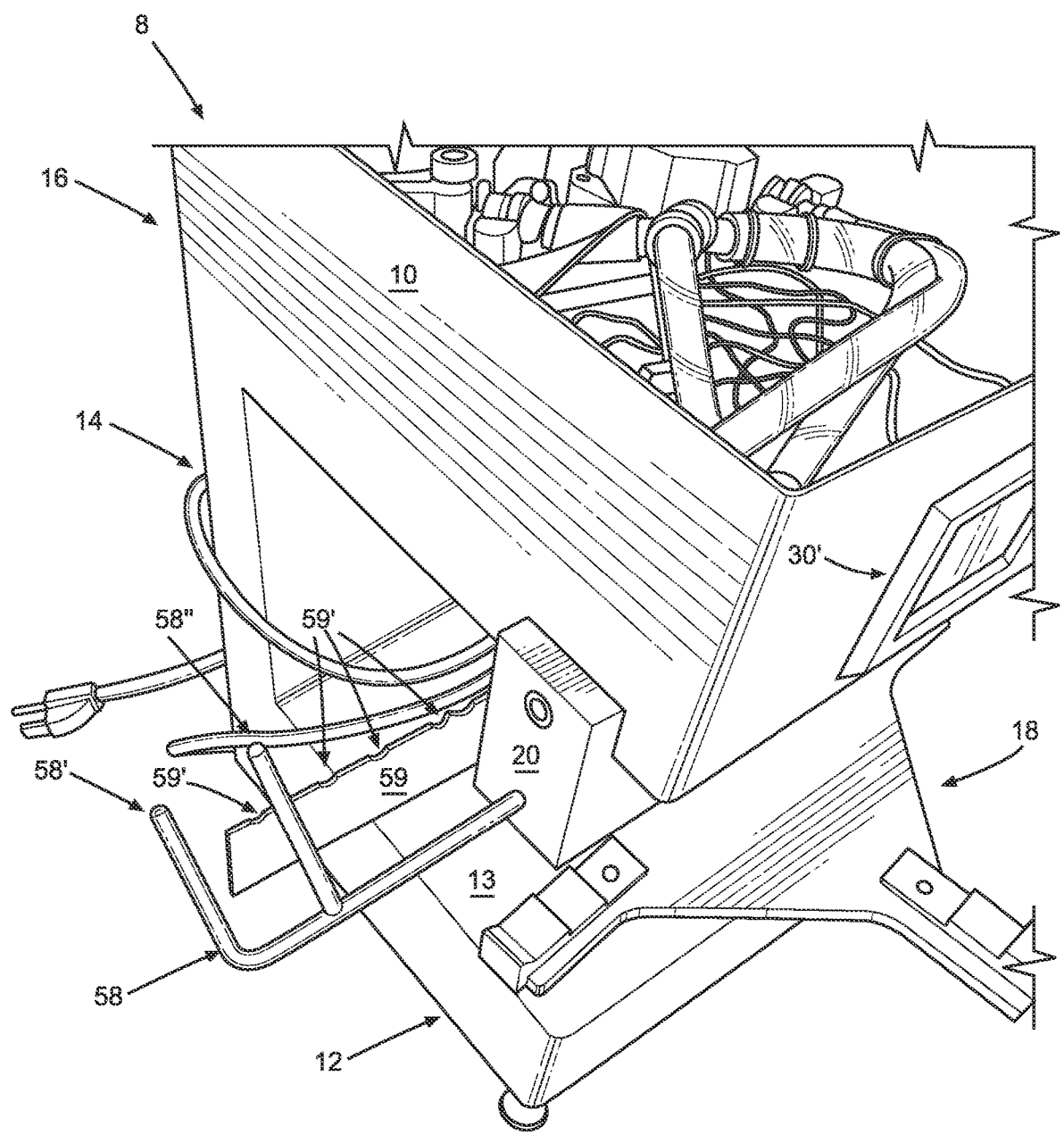
FIG. 1 is a view in perspective illustrating an embodiment of the invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

Disclosed herein is an apparatus 8 for saucing pizza crusts, which may be circular, substantially planar disks, and for applying fluent food products to other circular food products such as pita bread and pancakes. The apparatus 8 has a housing 10 that is preferably stainless steel or any material suitable for a food-preparation environment. The housing 10 provides a supportive framework to which components may be mounted, and has a base 12 that may rest upon a horizontal surface, such as a countertop or table, to support the rest of the apparatus 8. The base has an upwardly-facing deck 13, and a neck 14 extends upwardly from the base 12. The portion of the housing 10 extending over the deck 13 forms a head 16 that may contain numerous components of the apparatus 8, as explained in more detail herein. Preferably a central computer 30 (FIG. 3) is mounted to a sidewall of the head 16 and is connected, whether by wires or other means of communication (e.g., wireless transceivers), to various components of the apparatus 8. A touch screen 30' shown in FIG. 1 faces the user of the apparatus 8 when the apparatus 8 is in an operable orientation. The touch screen 30' may be connected to the central computer 30, and permits a user to input data, such as crust size, to the computer 30 by depressing desired portions of the screen or in another conventional manner.

Figure 2:
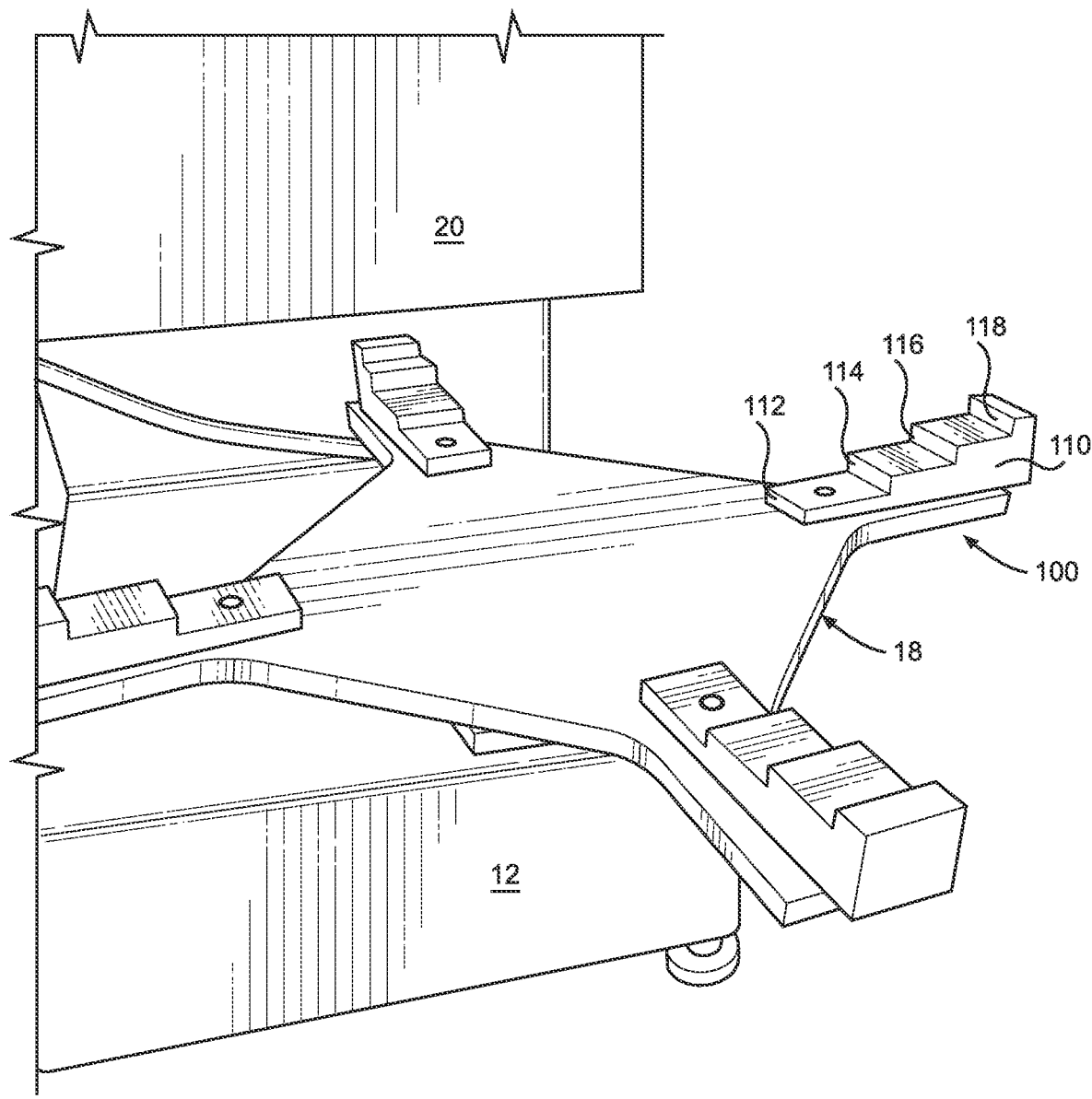
FIG. 2 is a view in perspective illustrating the embodiment of FIG. 1.
Figure 3:
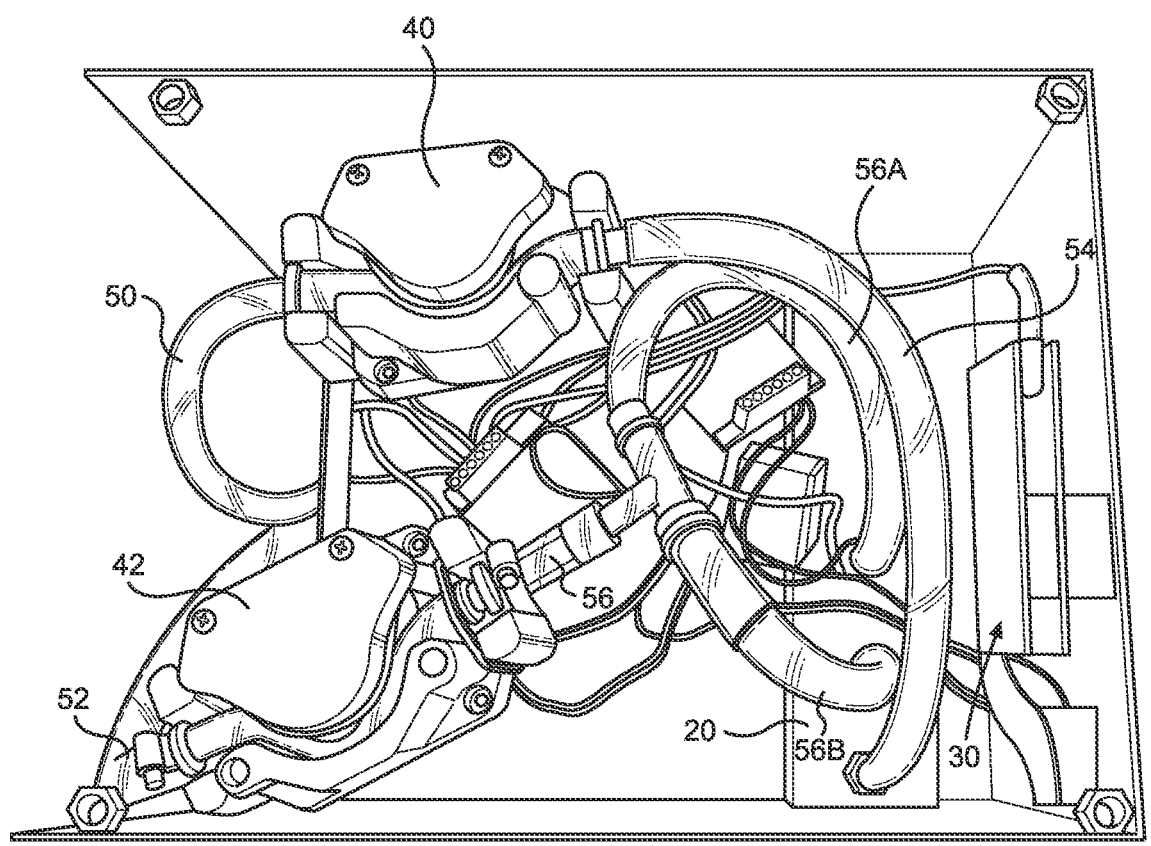
FIG. 3 is a top view illustrating the embodiment of FIG. 1 with the top of the housing removed for viewing of the contents.

A manifold 20 is fixed to the head 16, and preferably has a lower end that is below the head 16, with at least a portion of the lower end positioned directly above the deck 13 when in an operable orientation as shown in FIGS. 1-2. The manifold 20 may be disposed above a radius of a pizza crust. The manifold 20 may be a rectangular (parallelepiped) structure made of food-grade material, such as polyoxymethylene (acetal). The manifold 20 may be rigidly mounted to the floor of the head 16 and may extend downwardly from the head 16 toward the deck 13 as shown in FIGS. 1-3.

The manifold 20 has a plurality of passages formed therein to convey sauce from a source of sauce to the top surface of a pizza crust that is placed beneath the head 16. Fluid impelling means, such as peristaltic pumps 40 and 42, may be mounted in the head 16 and fluidically connected to inlets in the manifold 20. The fluid connections may be source tubes 50 and 52 that are fluidically connected at one end (not visible) to a source of sauce (not visible), which may be a bucket, a barrel, a bag or any food-grade container suitable for sauce. The sauce may be in any large container adjacent the pumps, and the tubes 50 and 52 draw the sauce into the pumps 40 and 42 in a conventional manner for pumps. The container may be within the housing of the apparatus 8. If an apparatus has a head larger than the apparatus 8, the container may be large, such as several gallons. Furthermore, a refrigerated cabinet may surround the sauce and the pumps as a self-contained temperature-controlled container. If a heat pump is used to cool the sauce, the same heat pump could be used to heat the sauce under different conditions.

The visible ends of the tubes 50 and 52 may be connected to the inlet ends of the pumps 40 and 42, respectively. The tubes 54 and 56, which are in fluid communication with the tubes 50 and 52, respectively, extend out of the pumps 40 and 42, respectively, with tube 54 extending directly to an inlet on the manifold 20. The tube 56 is divided into two tubes 56A and 56B, each of which extends to a respective inlet in the manifold 20. Thus, the pumps 40 and 42 may draw sauce from a source, or from multiple sources, through the tubes 50 and 52 and impel the sauce via the tubes 54, 56, 56A and 56B to the inlets of the manifold 20. The tubes may be any suitable size, such as 5/16 inch or 3/8 inch.

Figure 4:
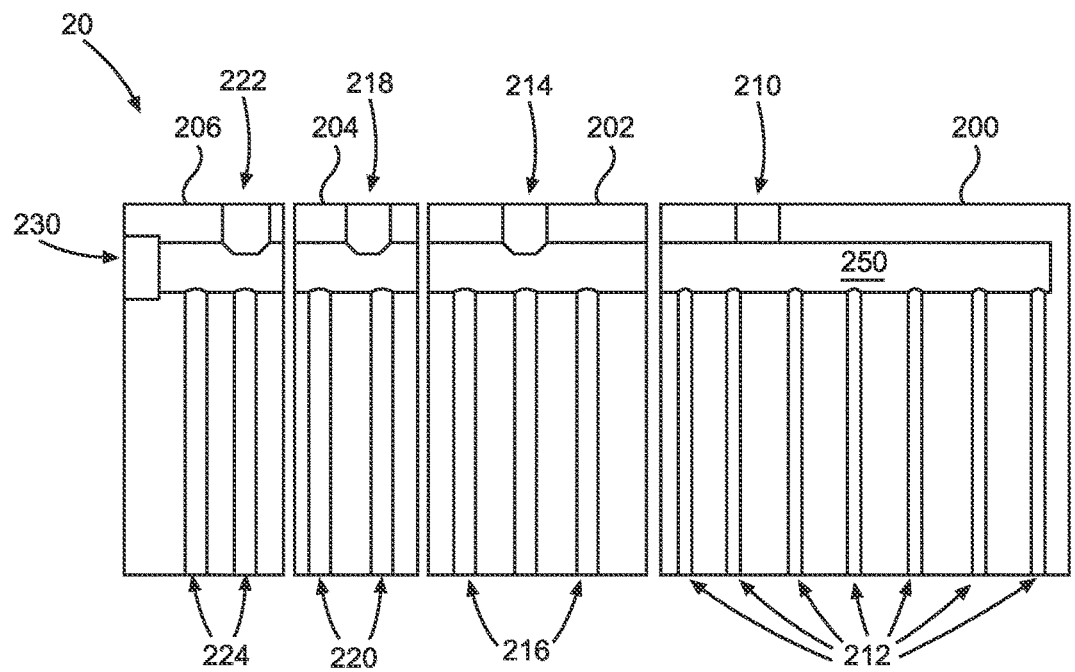
FIG. 4 is a schematic sectional view of an embodiment of the manifold.
Figure 5:
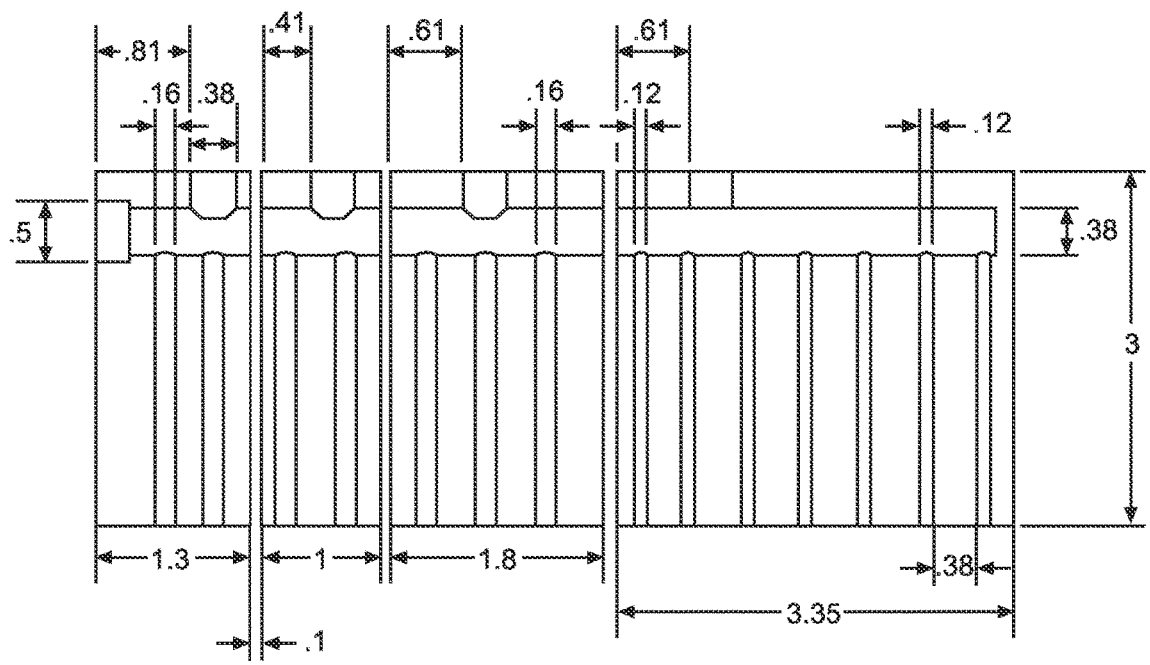
FIG. 5 is a schematic sectional view of the manifold of FIG. 4 including exemplary dimensional markings.

The manifold 20 is shown in cross section in the schematic views of FIGS. 4 and 5. FIG. 5 shows exemplary dimensions in inches for one embodiment of the manifold 20. Different dimensions are contemplated for other embodiments, which may be used with different sauces, pumps, and/or sauce temperatures.

The manifold 20 is shown in FIG. 4 having four segments, 200, 202, 204 and 206. Each segment has a respective inlet to receive sauce and at least one outlet to dispense sauce. The first segment 200 has an inlet 210 with which the tube 56A is in fluid communication, such as by mounting the end of the tube 56A to the top of the manifold 20 adjacent the inlet 210 in a conventional manner. The plenum 250 is a void extending along the top of the manifold 20 in fluid communication with the inlet 210 and the outlets 212 extending downwardly from the plenum 250.

The second segment 202 has an inlet 214 with which the tube 56B is in fluid communication, such as by mounting the end of the tube 56B to the top of the manifold 20 adjacent the inlet 214 in a conventional manner. The plenum 250 extends along the entire top of the manifold 20 in fluid communication with the inlet 214 and the outlets 216 extending downwardly from the plenum 250.

The third segment 204 has an inlet 218 with which the tube 54 is in fluid communication, such as by mounting the end of the tube 54 to the top of the manifold 20 adjacent the inlet 218 in a conventional manner. The plenum 250 extends along the entire top of the manifold 20 in fluid communication with the inlet 218 and the outlets 220 extending downwardly from the plenum 250.

The fourth segment 206 has an inlet 222 with which a tube is in fluid communication, such as by mounting the end of a tube (not visible) to the top of the manifold 20 adjacent the inlet 222 in a conventional manner. The plenum 250 extends along the entire top of the manifold 20 in fluid communication with the inlet 222 and the outlets 224 extending downwardly from the plenum 250.

The plenum 250 is defined by aligned sidewalls formed in the upper region of the segments 200, 202, 204 and 206. The sidewalls are preferably contiguous between segments of the manifold 20, thereby forming an elongated void. A structure, such as the rod 58 (FIG. 1), may be inserted in the plenum 250 for the purpose of selectively obstructing the plenum where the rod 58 is present. By obstructing the plenum, the rod 58 limits which inlets 210, 214, 218 and 222 sauce may be received into and which outlets 212, 216, 220 and 224 sauce may be dispensed from. The rod 58 may thus be inserted in the plenum 250 of selected ones of the segments 200, 202, 204 and 206. When any segment is obstructed by the rod 58, all of the outlets of that segment are typically obstructed. However, it is possible to obstruct only some of the outlets of any given segment even though this is not preferred.

In general, and relative to the circular crust that will be positioned beneath the manifold, the most radially inwardly located outlet in the manifold 20 should be positioned adjacent the center of rotation of the crust. Then the rest of the outlets of the manifold are aligned in a line, or in any other shape, extending radially outwardly toward the edge of the crust. The manifold 20 may be directly above the circular crust and along a radius of the crust, extending from the center to about the peripheral edge of the crust.

The manifold 20 may have some outlets that are used for all crust sizes, and other outlets that are used only for larger crust sizes. For example, with the embodiment of FIG. 4 the outlets 212 may be positioned closest to the center of the crust, with the right-most outlet 212 (in the illustration of FIG. 4) being nearest the axis of rotation of the crust. These outlets 212 may dispense sauce for every contemplated pizza crust size, including the smallest size. The outlets 216, in addition to the outlets 212, may dispense sauce for the next larger sized crust. The outlets 220, in addition to the outlets 212 and 216, may dispense sauce for the next larger sized crust. Finally, the outlets 224, in addition to the outlets 212, 216 and 220, may dispense sauce for the next larger sized crust. Therefore, an operator of the apparatus 8 may selectively dispense sauce from some or all of the outlets of the manifold 20, and this selective operation may take many forms, some of which are described herein.

The rod 58 may have an outer surface shaped similarly to the inner surface of the plenum 250. This shape may be circular cylindrical. The diameters of the rod 58 and the plenum 250 may be substantially equal to provide a sealing engagement to prevent sauce from flowing past the rod 58 where the rod 58 is disposed in the plenum 250. The rod 58 is contemplated to be inserted through the port 230, which is preferably coaxial with the plenum 250, and the rod's tip may extend through the plenum 250 a selected distance. In one example, the rod 58 is inserted into the plenum 250 with its tip reaching just to the right of the rightward-most of the outlets 216 (in the orientation of FIG. 4). In this example, sauce may flow into the inlet 210 and out of the outlets 212, but no significant amount of sauce may flow into or out of any other inlets or outlets of the manifold 20 due to the obstruction caused by the rod 58. In another example, if the tip of the rod is positioned just past the rightward-most of the outlets 220, then sauce may flow into the inlets 210 and 214 and out of the outlets 212 and 216, but sauce may not flow into or out of any other inlets or outlets. In yet another example, if the tip of the rod is positioned just past the rightward-most of the outlets 224, then sauce may flow into the inlets 210, 214 and 218 and out of the outlets 212, 216 and 220, but sauce may not flow into or out of any other inlet or outlets.

In this manner, the inserted end of the rod 58 serves as a selectively-positioned seal that limits which inlets and outlets sauce may flow into and out of. It is contemplated that the rod 58 may be marked or otherwise shaped on the portion of the rod 58 that is exterior to the manifold 20 to indicate to an operator where the bar should be positioned relative to the manifold 20 when it is desired to correspond to the size of a crust to be sauced. For example, as shown in FIG. 1, the rod 58 has one or more fingers 58' and 58" that align with a measurement strip 59 that has markings 59' along it. The markings 59' are at the locations that one of the fingers 58' and 58" aligns with when the rod 58 is in a desired location for a particular crust size. For example the leftward (in the orientation of FIG. 1) marking may indicate where the finger 58" is positioned when the inserted end of the rod 58 permits the flow of sauce into and out of the manifold 20 to sauce a crust of a particular diameter. The same marking may be where the other finger 58' is positioned when a crust of a different size is to be sauced.

It is contemplated, as an alternative to the rod 58, to dispose dividers between segments 200, 202, 204 and 206 of the manifold 20. Such dividers separate the plenum 250 into four separate voids. Combined with separate pumps, each of which is connected to a respective one of the inlets 210, 214, 218 and 222 and are controlled by the central computer, this system selectively controls which inlets and outlets receive and dispense sauce by which pumps are actuated by the computer. There are other means by which selection of the inlets and outlets that receive and dispense sauce can be made, including computer-actuated valves, solenoids connected to the rod 58 and other apparatuses that will become apparent from the disclosure herein to a person having ordinary skill.

It is preferred to supply to the crust more sauce per unit of time from outlets of the manifold that are farther from the center of rotation of the crust than from those outlets that are closer to the center of rotation due to the greater speed of the more peripheral portions of the crust as it passes beneath these more peripheral outlets. This may be accomplished by making the more peripheral outlets larger in cross section according to their position in the manifold 20 (see FIG. 5). Thus, the outlets 212 that always dispense sauce and are positioned closer to the center of the crust may be smaller in cross section than the outlets that are more peripherally positioned and are used optionally for larger crusts. Alternatively, the outlets may be the same size along the entire manifold 20 but the sauce may be dispensed at higher pressure from outlets that are farther from the center of crust rotation.

The outlets that dispense sauce on every crust size are closer to the center of the crust. The crust closer to the center moves less rapidly relative to the manifold 20 than the outlets that are closer to the periphery of the crust. The farther an outlet is from the center of the crust, the more surface area each outlet has to supply with sauce for a single revolution of the crust. Supplying more sauce to the crust per unit of time at outlets farther from the center of rotation of the crust may alternatively, or additionally, be accomplished by injecting sauce through a larger inlet that supplies outlets that are farther from the center of the crust, and/or narrowing the plenum 250 as it progresses closer to the center of rotation of the crust. Thus, one strategy to accomplish this is to create greater resistance to the flow of sauce as the sauce flows along the paths that are closer to the crust center, and to create reduced flow resistance as the sauce flows along the paths that are farther from the crust center. In this manner, less sauce per unit of time will be forced out of the outlets closer to the center of the crust, and more sauce per unit of time will flow out of the outlets closer to the periphery of the crust.

The outlets 212, 216, 220 and 224 preferably have a length and diameter that corresponds sufficiently with the sauce's viscosity and other characteristics to result in the sauce in the outlets not dripping substantially once the pumps that impel the sauce through the manifold 20 stop pumping. Such outlets will not drip sauce as long as no air or other fluid is supplied to the internal passages of the manifold 20, such as by removing the rod 58 from within the plenum 250. An outlet length of about two inches or greater is sufficient for outlets of the diameters shown in FIG. 5 when used with typical pizza sauce. Other lengths for other outlet diameters and viscosities may have sufficient characteristics that the sauce will not drip substantially out of the outlets when the pumps are turned off. In the embodiment of FIG. 1, if the rod 58 is removed from the port 230, air is permitted to flow into the plenum 250 and will permit the outlets to drip sauce after the pumps are turned off. But if the rod 58 is in the port 230, then there is no substantial dripping from the outlets because air is not permitted to flow into the manifold 20 to displace the sauce that gravity tends to pull down and out of the outlets.

Figure 12:
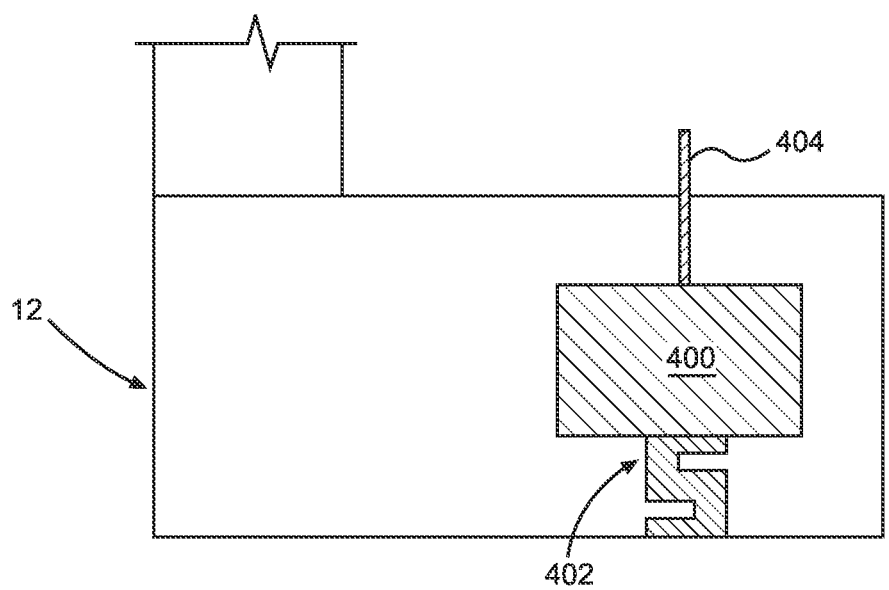
FIG. 12 is a schematic view in section showing the base portion of the apparatus with a motor and load cell, each of which is controlled by the central computer.

A tray 18 is rotatably mounted on the deck 13 for receiving the lower surface of a pre-cooked pizza crust (or raw dough that will form a crust upon cooking, both of which are included in the term "crust"), or a pan on which a crust rests prior to baking. A rotary prime mover, such as the electric motor 400 (FIG. 12), a pneumatic motor or any other rotary motor, is mounted in the base 12 with a driveshaft 404 that extends upwardly through the deck 13 and inserts into the underside of the tray 18. The central computer 30 (FIG. 3) is connected, by wires or other means of communication (e.g., wireless transceivers), to the rotary prime mover that drives the tray 18. The central computer 30 may actuate the rotary prime mover to drive the tray 18 rotationally at the desired speed as programmed and as described in more detail herein. A load cell 402 (FIG. 12) may be disposed between the housing of the base 12 and the electric motor 400, to signal the computer 30 with the amount of weight disposed on the load cell 402. This weight information may be used to determine the diameter of the crust.

The tray 18 has a plurality of arms 100 (FIG. 7) that extend outwardly from a center point, around which the tray rotates as driven by the rotary prime mover in the base 12. The aperture 102 is aligned with the tray's 18 center of rotation and the drive shaft 404 may be inserted into the aperture 102 when the tray 18 is in an operable position on the deck 13 as shown in FIGS. 1-2.

As shown in FIG. 2, each of the tray's 18 arms 100 has a pan edge holder (the holder 110 being used as an example for the holders of the other arms, all of which are substantially identical). Multiple boundary-defining lips are formed on each respective holder. In the embodiment shown in FIG. 2, the holder 110 has four lips 112, 114, 116 and 118, and the other holders on the other arms have from similar lips. When a pizza pan, which may be a rigid disk with a curved peripheral edge to retain the crust, is placed on the tray 18, the peripheral edge seats against a corresponding one of the lips on all of the aligned holders on the tray 18. For example, a small pan may be disposed on the tray 18 with its peripheral edge seated against the lip 112 and the corresponding lowest lips of the holders of the remaining arms of the tray 18. A larger pan may seat against the lip 114 and all of the corresponding next higher lips on the holders of the remaining arms of the tray 18, and so forth for all larger pans. Therefore, the distances between corresponding lips of each of the holders are predetermined in order that each of the discrete pan sizes fits between a corresponding set of lips. Exemplary diameters of pans, and thus distances between corresponding opposite lips, may include 14, 12, 10 and 7 inches.

Figure 7:
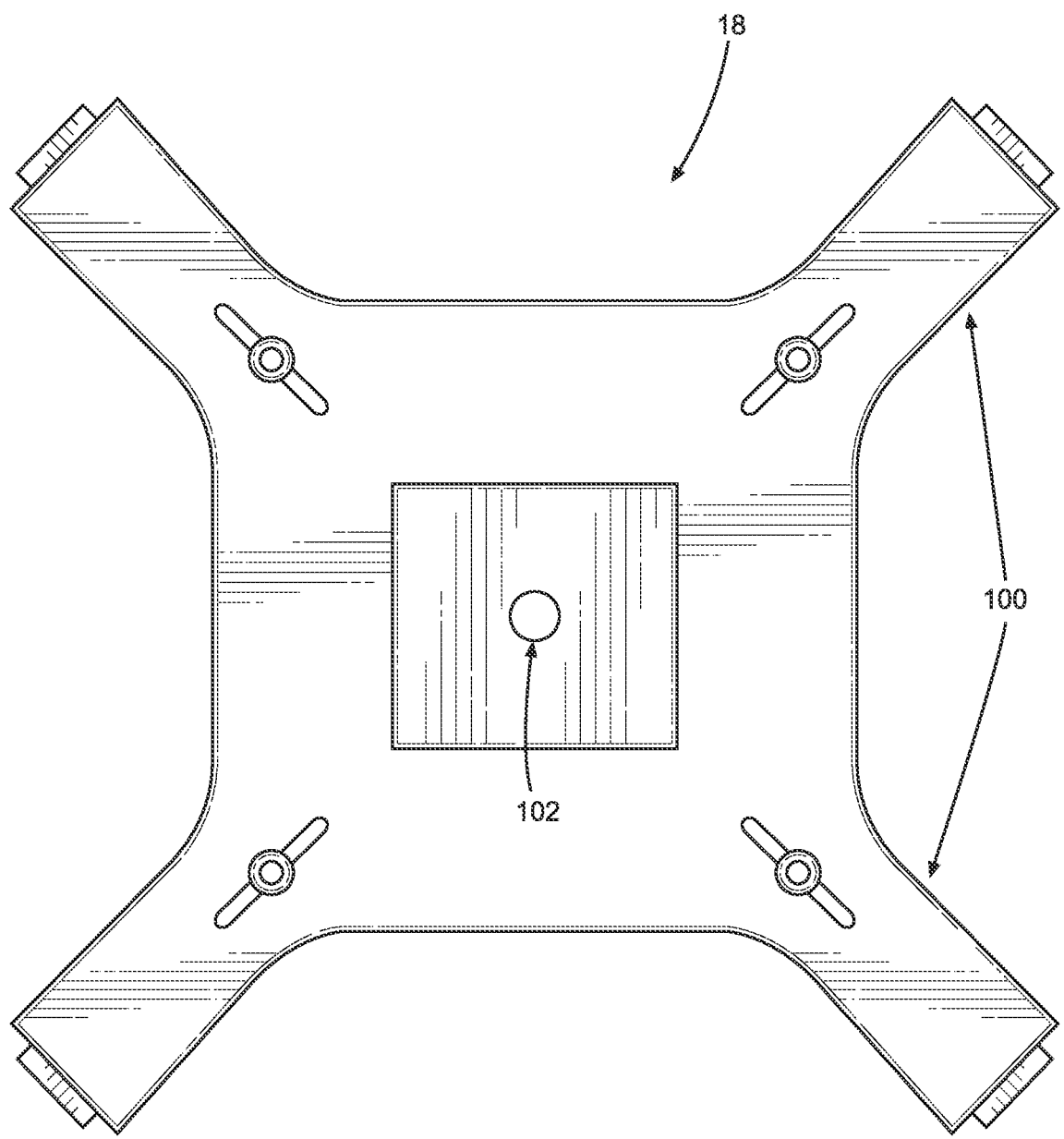
FIG. 7 is a bottom view of an embodiment of a tray.

It is contemplated to adjustably mount the holder 110, along with all other holders, on the arms 100 of the tray 18, as shown in FIG. 7 from the bottom. The arms 100 have radial slots through which are disposed threaded shafts extending rigidly from the holder 110 and the respective other holders. A nut is threaded onto each shaft and tightened against the underside of each arm when the holder is in the desired position. The nut is loosened and the holder is moved to another position, whereupon the nut is tightened again to retain the holder in the desired position.

The apparatus 8 operates as follows. When an inlet in a segment of the manifold 20 receives sauce, the outlets of that same segment dispense the sauce, which falls by gravity directly downwardly. Thus, to be sure the sauce is dispensed onto an awaiting crust, it is preferred that the operating outlets are positioned directly above a pizza crust resting on a pan on the tray 18 when the sauce dispensing process is initiated. The diameter (or radius) of the pizza crust that is placed on the tray 18 preferably corresponds to the particular inlets of the manifold 20 that are selected to receive sauce, because it is preferred to control which outlets dispense sauce by the inlets that receive pressurized sauce. In a preferred embodiment, the diameter or radius of the crust is input as data into the central computer 30, such as by using the touch screen or by the weight being conveyed to the computer. The diameter is used to determine the speed at which the tray 18 is rotated, as well as the position of the rod 58 (or any other means by which it is determined to selectively dispense sauce out of only some outlets), thereby causing the apparatus 8 to dispense sauce out of only the outlets of the manifold 20 that have crust beneath them. Each segment's outlets are disposed above all or a portion of the radius of a circular pizza crust resting on the tray 18.

By supplying sauce to selected inlets of the manifold 20, only corresponding outlets of those segments will dispense sauce onto the awaiting crust. The computer 30 is pre-programmed to actuate the rotary prime mover as a function of the diameter of the pizza crust. Upon rotation of the crust during dispensing, the entire upper surface of the crust is coated with sauce, except a portion around the periphery, if desired.

Figure 8:
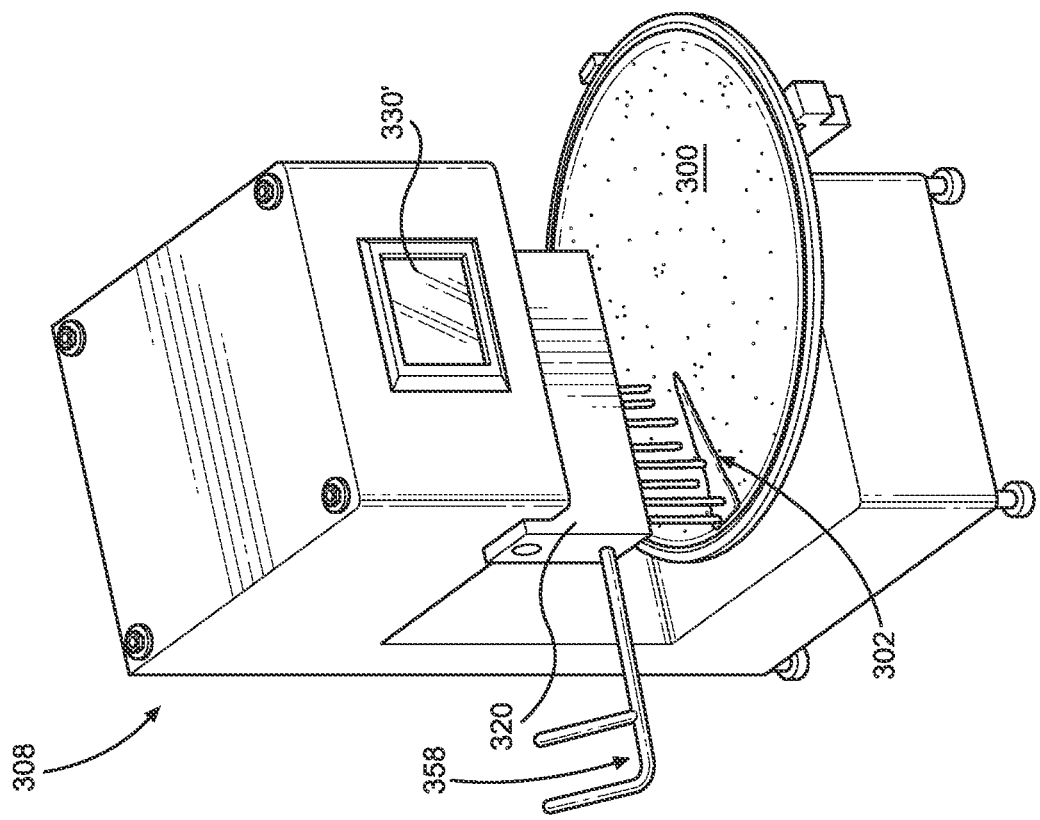
FIG. 8 is view in perspective illustrating an embodiment of the invention during operation at a first stage when the crust is initially being coated with sauce.

In one example shown in association with FIGS. 8-11, an apparatus 308 has a touch screen 330' that is connected to a central computer (not visible) and into which an operator enters the diameter or radius of the pizza crust 300 resting upon the apparatus 308. In an alternative embodiment, the weight on the load cell 402 is used by the computer to determine the diameter of the crust 300. The computer uses pre-programmed software to convert the size of the crust into a speed at which a rotary prime mover, which is drivingly linked to the tray upon which the crust 300 rests, is rotated. As the crust 300 begins rotating, the computer actuates one or more pumps (not visible) in the apparatus 308 to impel sauce from a source, through the pump(s) and to the manifold 320 mounted to the apparatus 308 with its lower edge directly above the crust 300. Upon actuation of the pumps, sauce flows through the manifold 320 (which may be similar to the manifold 20 described above) and out of the outlets thereof. This sauce falls down onto the crust 300 and forms a line of sauce 302 initially as shown in FIG. 8.

Figure 9:
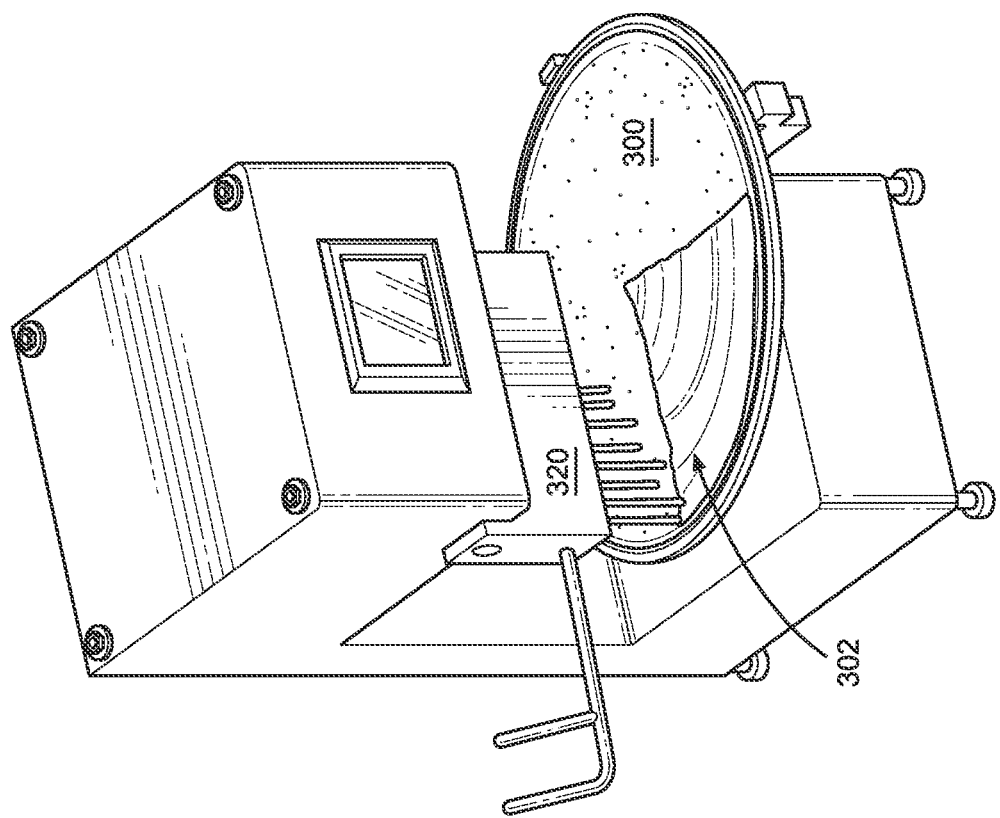
FIG. 9 is a view in perspective illustrating an embodiment of the invention during operation at a second stage when the crust is approximately one-quarter coated with sauce.
Figure 10:
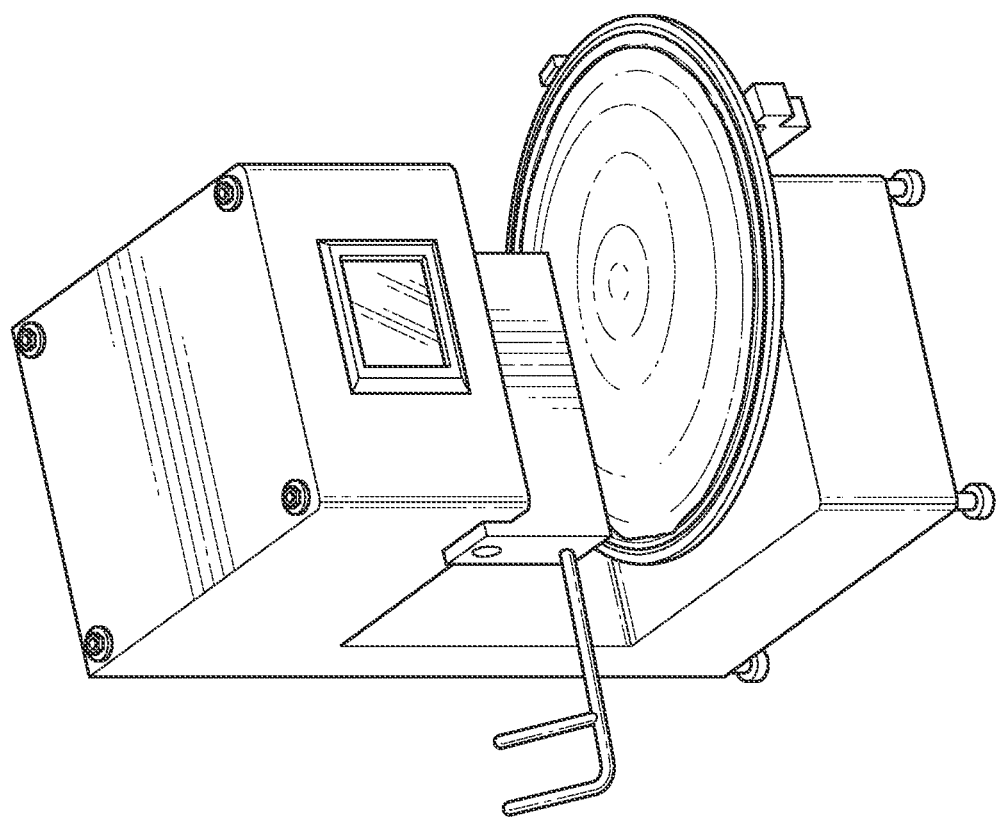
FIG. 10 is a view in perspective illustrating an embodiment of the invention during operation at a third stage when the crust is mostly coated with sauce.

Upon further rotation of the crust 300, the area of the crust 300 that passes beneath the flow of sauce out of the manifold 320 and is coated with sauce 302 increases. In FIG. 9 a larger portion of the crust 300, which may be about one-quarter of the crust due to about 90 degrees of crust rotation, is shown covered with sauce 302. Upon further rotation, as shown in FIG. 10, a larger portion of the crust 300 is coated with sauce 302. Upon full rotation, which may be about 360 to about 370 degrees (shown in FIG. 11), the portion of the crust 300 coated with sauce is complete due to full rotation of the crust 300 under the manifold 320. It should be understood that the crust may be rotated two full revolutions, if desired. The crust may alternatively be rotated slightly more than a full revolution to make up for the delay in time between when the crust begins rotating and when the falling sauce reaches the crust. If desired, a small portion of the periphery of the crust may not be coated with sauce, as shown in FIG. 11, in order to make holding of the baked pizza by the consumer less messy.

Figure 11:
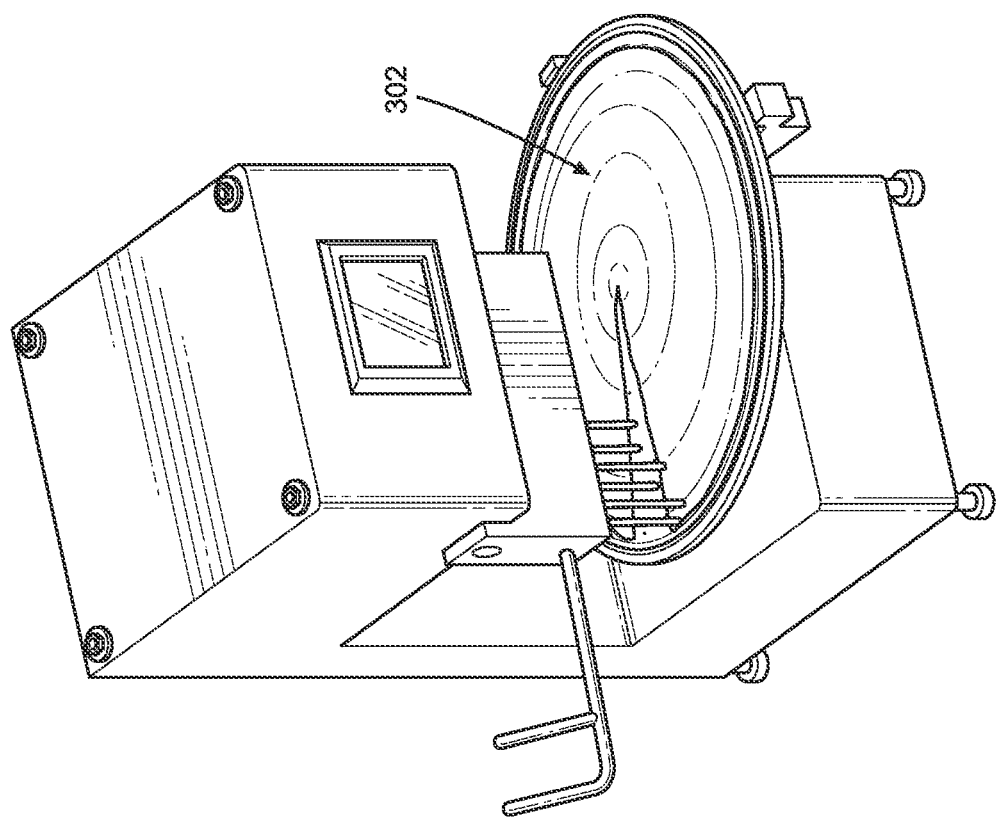
FIG. 11 is a view in perspective illustrating an embodiment of the invention during operation at a final stage when the crust is completely coated with sauce.

Once the crust 300 is coated with sauce 302 as shown in FIG. 11, the crust 300 is removed from the tray and replaced with another crust that has no sauce on it. The size of the new crust is entered into the computer via the touchscreen 330', the weight measurement or another input, and the process of rotating the crust and dispensing of sauce begins again as described above. Once each sauced crust is removed from the apparatus 308, it may be topped, baked and then consumed, or any other steps may be taken as desired.

In the embodiment of FIG. 3, there are two pumps 40 and 42, both pumping at essentially the same volume per unit of time. The pump 40 injects sauce through the inlet 218 that supplies sauce to the outlets 220 that are at the most peripheral portions of the crust, which are farthest from the center of rotation of the crust. The pump 42 injects sauce through the inlets 210 and 214 that supplies sauce to the outlets 212 and 216 that are closer to the center of rotation of the crust. The pump 42 pumps sauce to a splitter that supplies the sauce to two tubes 56A and 56B that flow to the inlets 210 and 214. The inlet 210 always permits sauce to be received to the segment 200 and the inlet 214 is selectively opened or closed to permit or prevent sauce to flow to the segment 212.

The pumps 40 and 42 may be peristaltic pumps, which may have the same flow rating or they may have different flow ratings. By using different tube sizes to inject sauce into the manifold 20, or other restrictions as described herein, flow rate may be controlled other than by the pump's flow rating.

The distance between the bottom of the manifold 20 and the top surface of the crust is important. For example, the desired distance allows gravity to cause the falling sauce to spread (splatter) when it impacts, but an incorrect distance does not spread enough or spreads too much and some of the sauce is directed off of the crust. The preferred distance between the bottom of the manifold 20 and the top surface of the crust is about three to about four inches. The temperature of the sauce affects how much it spreads when dispensed from a given height.

Because of the shape of the holder 110 and the substantially identical holders on the other arms of the tray 18, the diameter of the pizza crust affects the distance between the bottom of the manifold 20 and the top of the pizza crust. As an example, in one embodiment, the top surface of a 14 inch diameter crust is about 2.75 inches from the bottom of the manifold 20. A 12 inch diameter pizza crust is about 3 inches from the bottom of the manifold 20. A 10 inch crust is about 3.25 inches and a 7 inch crust is about 3.5 inches. These distances are not critical, but are exemplary of one embodiment.

It is contemplated that the apparatus 8 may adjust the speed of rotation of the tray 18 as a function of the crust size. The smaller the diameter of the crust, the faster the crust may be rotated. For example, a 7 inch diameter crust may be rotated for two to three seconds before it is fully sauced, and a 14 inch diameter crust may rotate for six to eight seconds before it is fully sauced. The tray 18 may be rotated by a variable speed prime mover, and thus may be rotated at a preset speed for the size of crust input to the computer. The temperature of the sauce may be detected or input and this data communicated to the computer. The computer may adjust the rotational speed of the tray accordingly, along with any other factors to accommodate any differences, such as viscosity, in the sauce.

One embodiment of a process of using the apparatus 8 may begin with a user disposing a crust on the tray 18, entering data about the size of the crust and actuating the apparatus to operate, such as by pressing a button, or a region on the touchscreen, marked "start." As noted, the computer may automatically determine the crust size using the weight data from the load cell 402, and the computer may tare between each crust placed on the tray 18. The computer actuates the tray to rotate the crust 360 degrees while dispensing sauce onto the crust. The computer may be programmed to rotate the crust slightly more than 360 degrees to ensure coverage, but this should not be so much that there is significant overlap of the sauce. The rotational movement of the crust is simultaneous with one or more pumps pumping sauce to the outlets of the manifold designated to dispense, such as by the position of the bar 58 or some other means. The size of the crust, and therefore the outlets that will dispense sauce, may alternatively be set by manually positioning the rod 58 prior to pressing the start button. Alternatively a solenoid may move a rod (similar to the rod 58), and the solenoid may be actuated by the computer according to the diameter of the crust. Alternatively, if there are discrete outlet arrays, such as the segments 200, 202, 204 and 206 separated from one another, the computer may control each of a plurality of pumps that inject sauce to a discrete outlet array. For example, the inner outlets 212 may receive sauce from a first pump, the next outlets 216 may receive sauce from a second pump, the next outlets 220 may receive sauce from a third pump and the next outlets 224 may receive sauce from a fourth pump.

Figure 6:
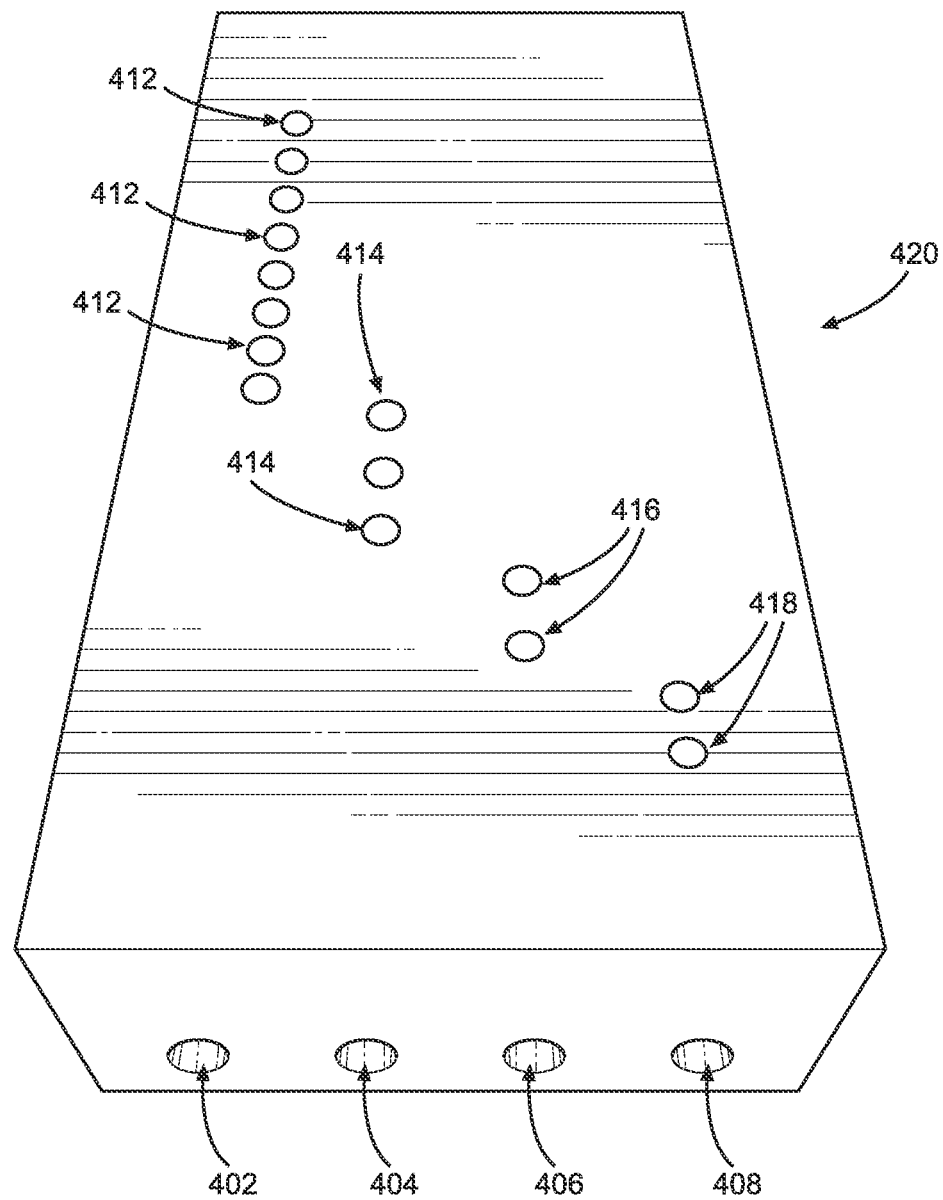
FIG. 6 is a view in perspective illustrating another embodiment of a manifold.

Another manifold embodiment is shown in FIG. 6. The manifold 420 is also a parallelepiped shape with inlets 402, 404, 406 and 408 to which tubes may be attached to inject sauce thereinto from pumps. Each of the outlets 412, 414, 416 and 418 is in fluid communication with a respective one of the inlets 402, 404, 406 and 408. Therefore, sauce injected into inlet 402 is dispensed out of outlets 412, sauce injected into inlet 404 is dispensed out of outlets 414, and so forth for all inlets and outlets of the manifold 420. Each of the inlets 402, 404, 406 and 408 may be supplied sauce from a different pump, whereby the control of the pumps determines which outlets dispense sauce. The top of the manifold 420 is shown facing upwardly in the illustration of FIG. 6, but in use the outlets of the manifold 420 are preferably mounted directly above a rotatable tray facing downwardly to dispense sauce directly onto the crust.

It is contemplated to use the apparatus disclosed herein for a square-shaped pizza. Instead of using the rotary tray 18, a person would manually, or a conveyor belt would automatically, move the crust below the manifold when the sauce is dispensed onto the crust. Such a manifold would have outlets over the entire width of the crust.

It is also contemplated to convey a crust under the manifold by a conveyor, such as in a line and then rotate the crust. After the crust is sauced, the conveyor moves the crust further, and then removes the crust from the conveyor. In this manner, the apparatus is part of an assembly line to sauce and top pizzas using automation.

It should be understood that a manifold is contemplated that supplies sauce along the entire diameter of the pizza, and may do so during only about one-half of a rotation of the pizza crust. The making and operation of such an alternative will be apparent to a person of ordinary skill from the description herein.

An alternative embodiment of the invention is shown in the apparatus 508 in FIGS. 13-22, which has an alternative manifold 520 with an inlet portion 530, a chamber portion 540, a dispenser portion 550, and plates 560 and 562. The portions of the manifold 520 may be separated for cleaning. Each portion that has passages through which sauce is conveyed has substantially straight passages so there are no curves where food could collect and spoil, thereby making the manifold 520 capable of thorough cleaning.

The inlet portion 530 is rigidly connected to the head 516 of the apparatus 508, and has four inlets 531, 532, 533, and 534 in fluid communication with tubes from four pumps 581, 582, 583 and 584 mounted in the head 516 that are similar to the pumps described herein. Any number of pumps and inlets are contemplated. Each of the pumps 581-584 may be connected to a respective one of the inlets 531-534 via the conduits 591, 592, 593, and 594, respectively. This configuration provides the ability to control which of the inlets 531-534 receives pressurized sauce by controlling which of the pumps 581-584 is actuated. The bores of the inlets 531-534 may be vertically-oriented in the operable orientation of FIG. 13.

Figure 13:
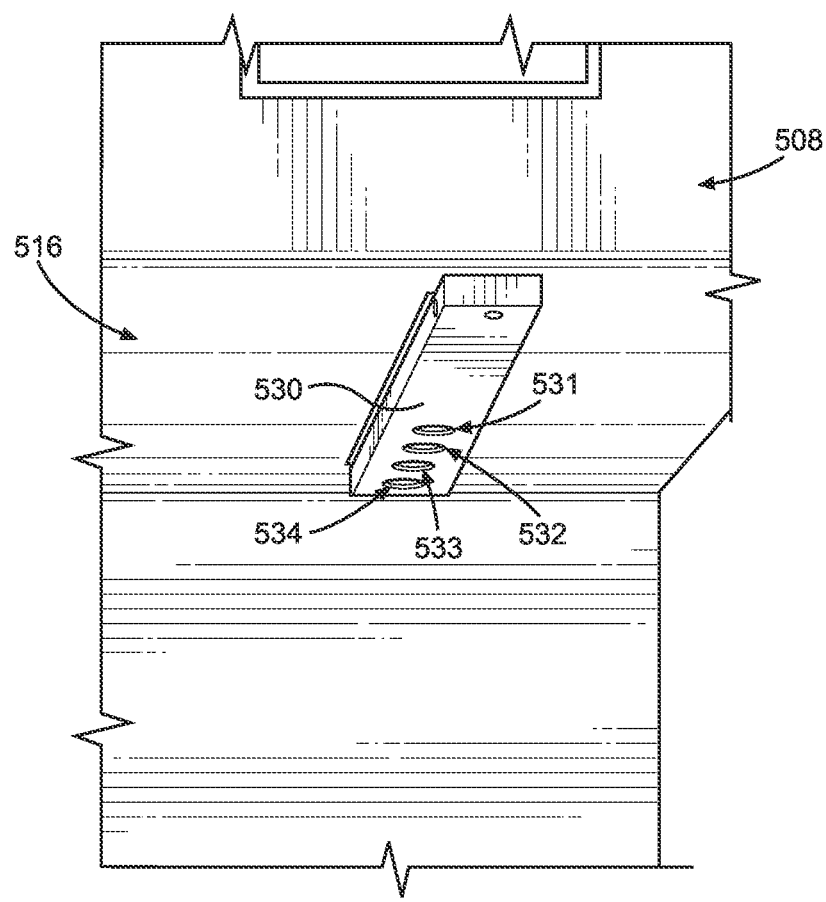
FIG. 13 is view in perspective illustrating an alternative embodiment of a manifold on an alternative embodiment of the invention.
Figure 15:
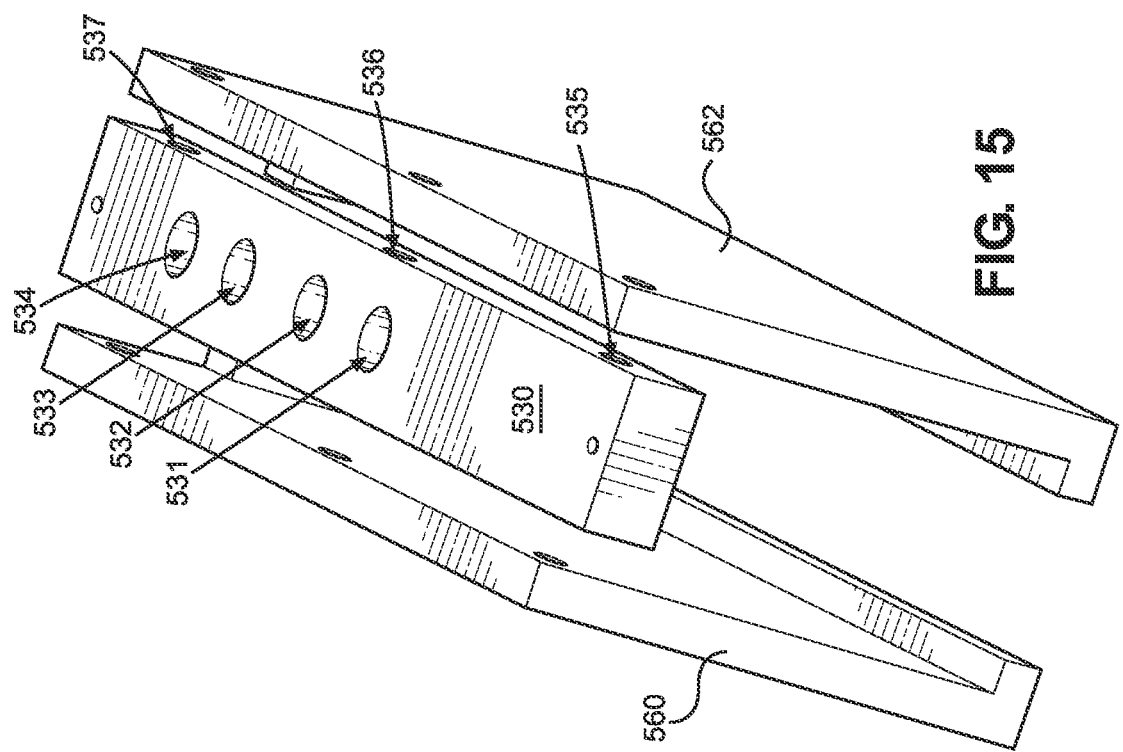
FIG. 15 is an exploded view in perspective illustrating the alternative manifold of FIG. 13.
Figure 14:
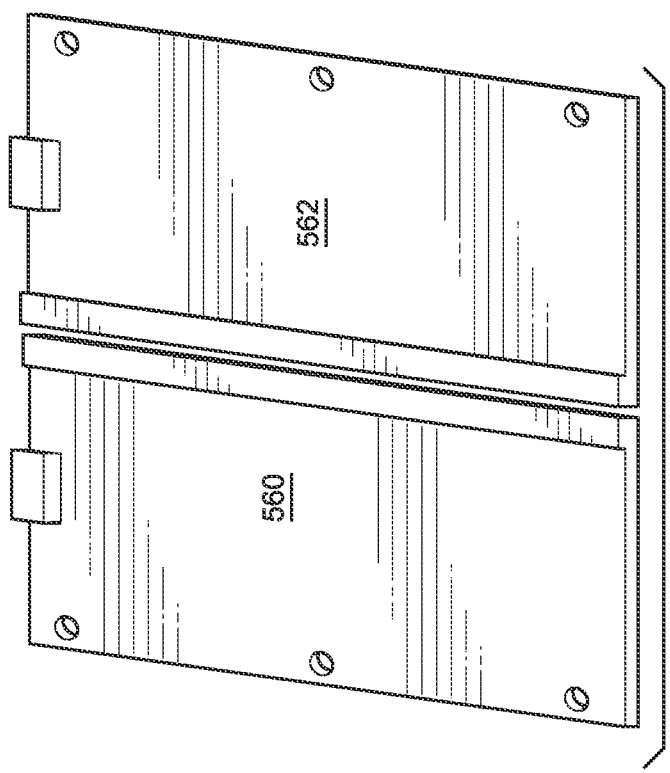
FIG. 14 is top view illustrating a portion of the alternative manifold of FIG. 13.
Figure 17:
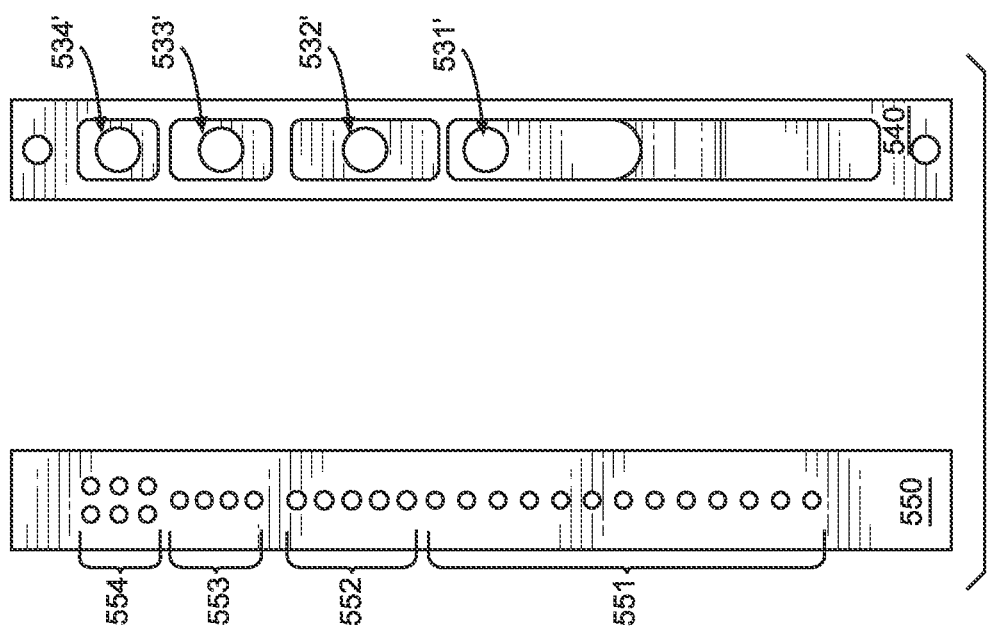
FIG. 17 is a top view illustrating the two portions shown in FIG. 16.
Figure 16:
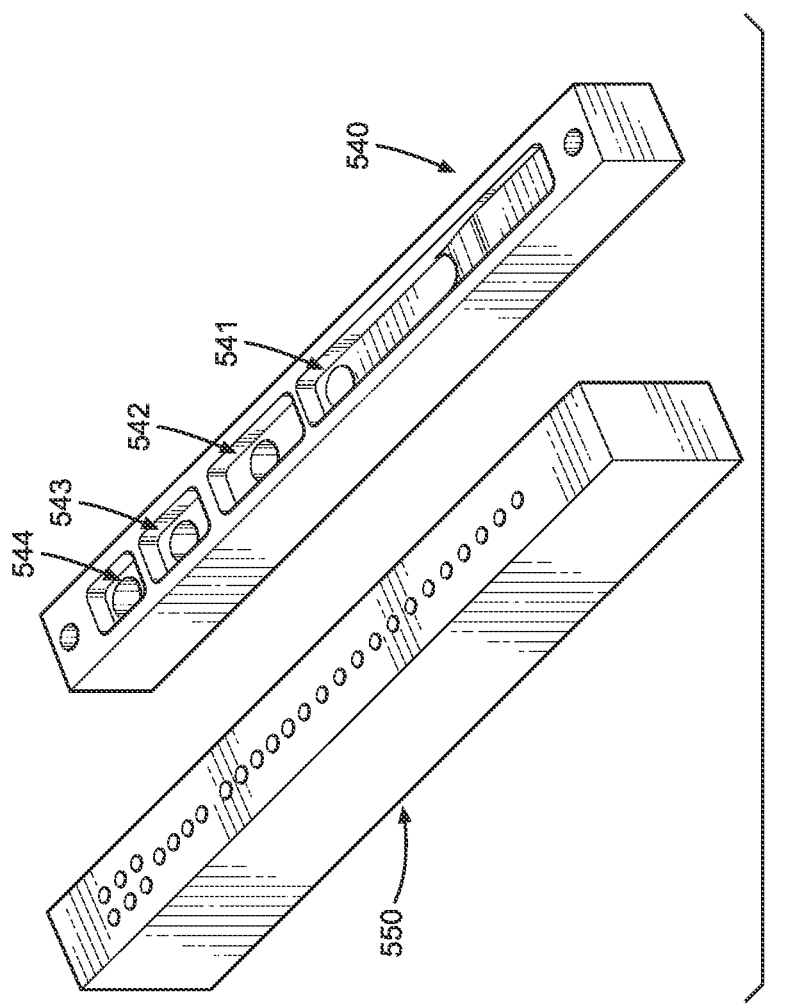
FIG. 16 is a view in perspective illustrating two portions of the alternative manifold.
Figure 18:
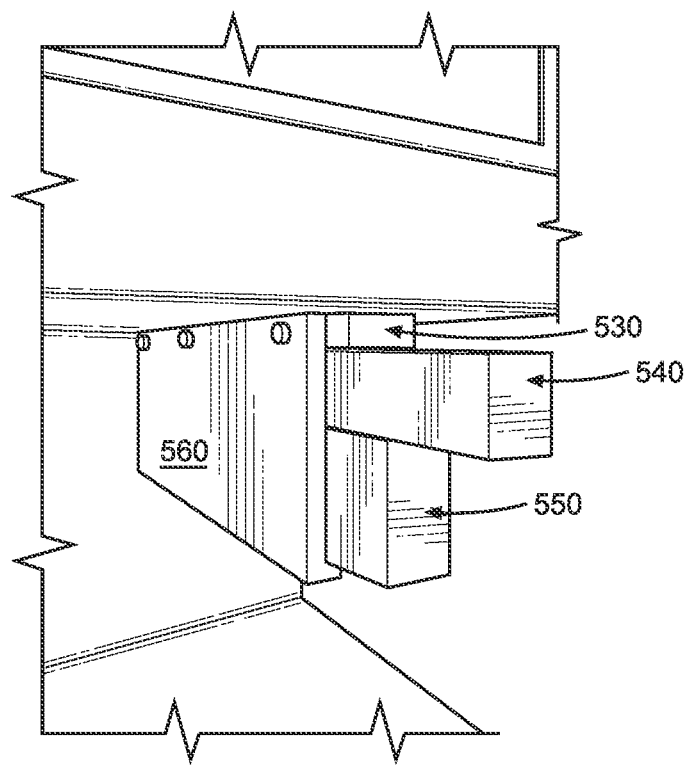
FIG. 18 is a view in perspective illustrating the alternative manifold in partial assembly.
Figure 19:
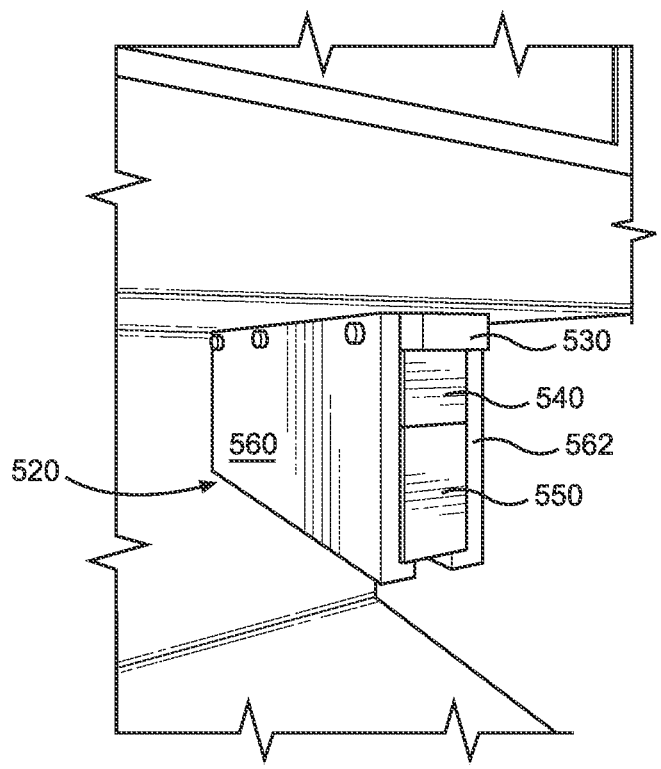
FIG. 19 is a view in perspective illustrating the alternative manifold.
Figure 21:
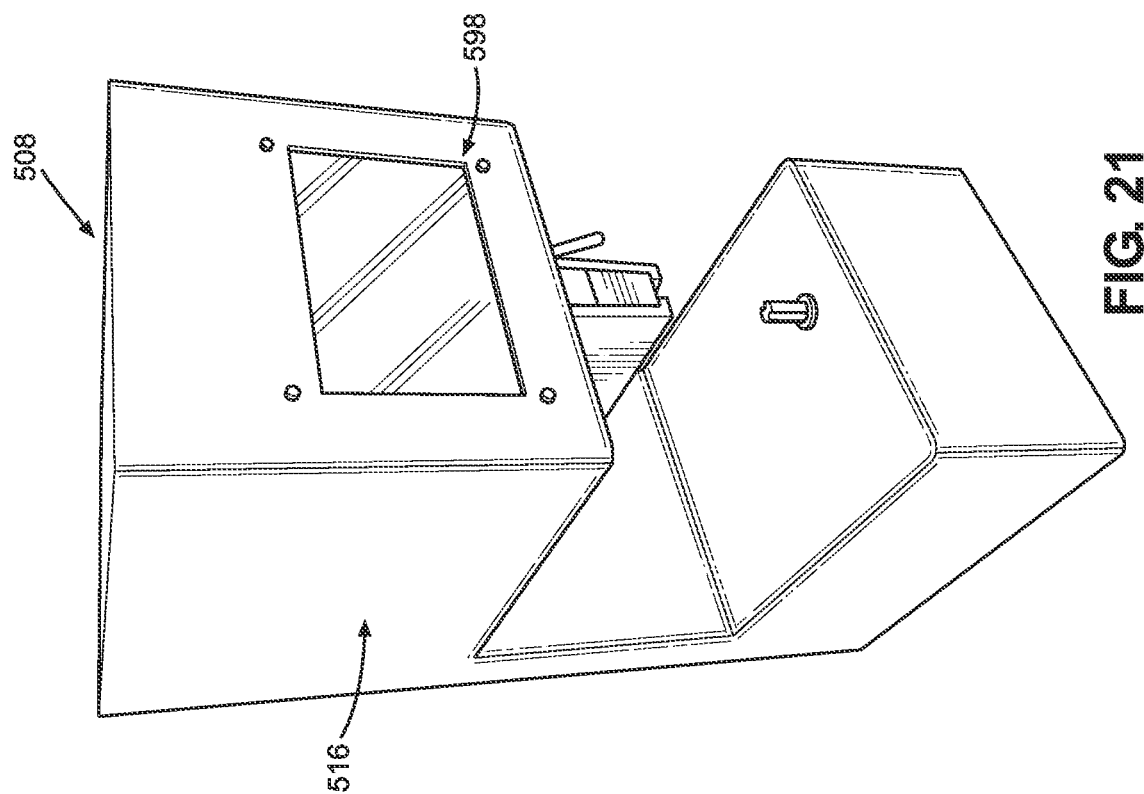
FIG. 21 is a view in perspective illustrating the alternative embodiment of FIG. 13.
Figure 20:
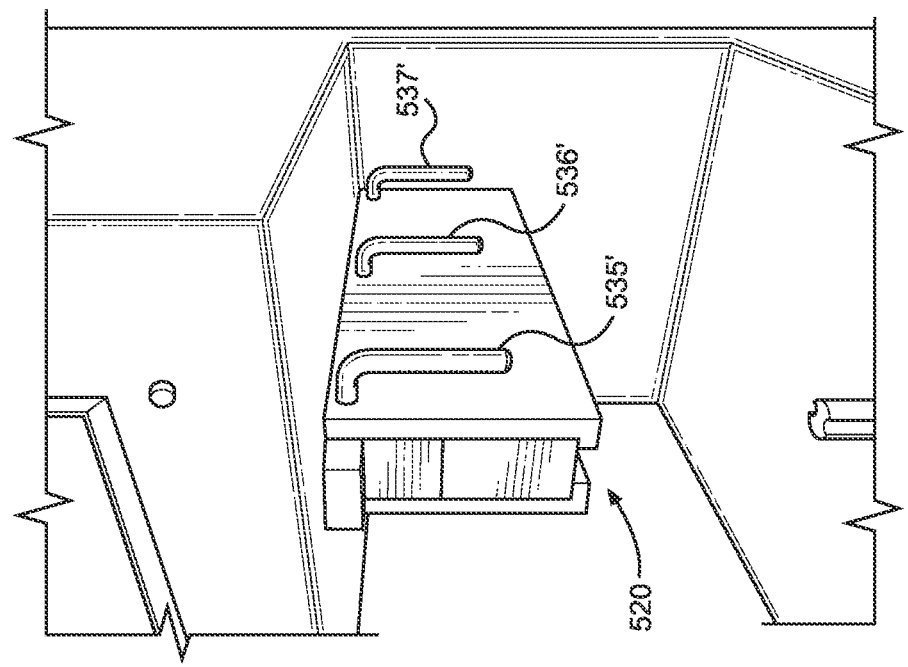
FIG. 20 is a view in perspective illustrating the alternative manifold.
Figure 22:
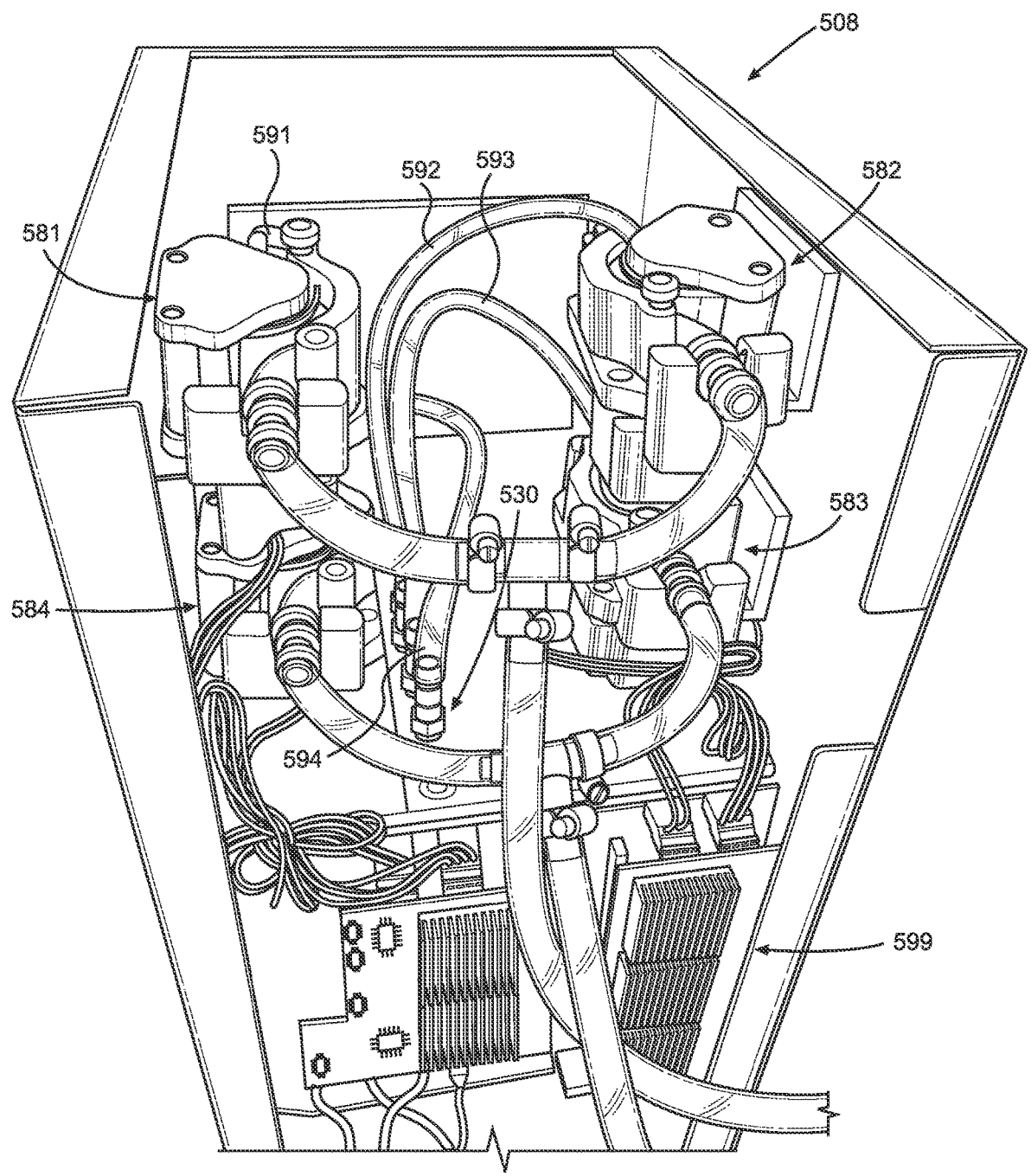
FIG. 22 is a rear view in perspective illustrating the alternative embodiment of FIG. 13 with the rear and top sidewalls removed for visibility of the interior thereof.

The inlet portion 530 may have three apertures 535, 536 and 537 that are horizontally oriented in the operable orientation of FIG. 13. The apertures 535-536 permit attachment of the plates 560 and 562 to the inlet portion 530 by receiving the pins 535', 536' and 537' as shown in FIGS. 19-20.

The chamber portion 540 is positioned just beneath the inlet portion 530 and is in a sealing relationship with the inlet portion 530 such that sauce in the inlets cannot pass through the juncture of the two portions. The openings 531', 532', 533', and 534' align substantially coaxially with, and correspond to, the inlets 531-534, respectively. The chamber portion 540 has cavities 541, 542, 543 and 544 that are in fluid communication with the openings 531'-534'. The cavities form discrete chambers that are defined in part by the sidewalls of the cavities 541-544 and in part by the sidewall of the dispenser portion 550 against which the chamber portion 540 seats, as described herein. The chambers of the chamber portion 540 guide sauce that is received by the manifold 520 from the outlets 531-534, and conveyed to the openings 531'-534', to the dispensing passages in the dispenser portion 550. Each of the chambers is in fluid communication with a respective one of the pumps of the apparatus 508, and extends generally horizontally along the length of the chamber portion in an operable orientation. Thus, when an associated one of the pumps 581-584 is actuated, that pump impels sauce to the chambers to pressurize the sauce in each respective chamber. When multiple of the pumps are actuated, multiple of the chambers are pressurized.

The dispenser portion 550 is mounted in a sealing relationship with the chamber portion 540, has elongated dispensing passages that may be vertically oriented in the orientation of FIGS. 19-20 and sits below the chamber portion 540 in the operable position shown in FIG. 19. The dispensing passages may be grouped into clusters, such as the clusters 551, 552, 553, and 554, which clusters are positioned adjacent to the cavities 541, 542, 543, and 544, respectively, in the chamber portion 540 when the manifold 520 is in an operable orientation. The diameter of the passages in each cluster may be the same and may differ from the diameter of the passages in other clusters. During operation, one or more of the passages may receive sauce (from one or more of the pumps 581-584) that is impelled into the chambers defined by the cavities 541-544 and the sidewall of the dispensing portion 550, and the pressurized sauce may be forced through the passages in the dispensing portion 550 and onto a rotating crust below. In one embodiment, the first pump 581 controls pressurized sauce conveyed to the first cluster 551 of passages, a second pump 582 controls pressurized sauce conveyed to the second cluster 552 of passages, a third pump 583 controls pressurized sauce conveyed to the third cluster 553 of passages, and a fourth pump 584 controls pressurized sauce conveyed to the fourth cluster 554 of passages. Thus, the operator controls which passages the sauce is dispensed from by manually selecting a crust size, or by some other automated feature, such as the weight of the crust being detected by the apparatus 508.

The side plates 560 and 562 restrain the vertical and horizontal positions of the inlet, chamber and dispenser portions once the pins 535', 536' and 537' are extended through the aligned apertures 535, 536 and 537, respectively, in the plates 560 and 562 and the inlet portion 530.

Each of the chambers of the manifold 520 may be pressurized by a single pump, so that to pressurize a chamber (and therefore dispense sauce from particular passages) the operator simply actuates a pump that is connected to that chamber. In one embodiment, there are four pumps 581-584, each of which is connected to a particular one of the chambers. To sauce a 7 inch pizza, the operator actuates a first pump that pressurizes the first chamber. To sauce a 10 inch pizza, the operator actuates the first and second pumps that pressurize the first and second chambers. To sauce a 12 inch pizza, the operator actuates the first, second and third pumps that pressurize the first, second and third chambers. To sauce a 14 inch pizza, the operator actuates all four pumps that pressurize all four chambers. Pressurization may be carried out manually, such as by pressing a switch or a touchscreen 598, or by the computer 599 automatically measuring the weight of the crust and actuating the pump or pumps. There may be any desired number of pumps.

Any of the above described embodiments may be part of a larger machine with multiple structures, each of which performs a different portion of constructing a pizza. It is also to be understood that the manifold may not be directly above the tray that holds the pizza crust, but may be in fluid communication with outlets, such as ends of tubing, that are positioned above the tray. This avoids the need for the manifold itself to be directly above the pizza crust, which is the preferred embodiment due to the reduction in tubing needed to be cleaned.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An apparatus for applying pizza sauce to a pizza crust, the apparatus comprising:
    (a) a manifold disposed above a tray that is for holding and rotating the crust, the manifold having at least first and second inlets, each of which is in fluid communication with multiple outlets, wherein the outlets are positioned directly above the crust;
    (b) a first pump in fluid communication with at least the first inlet and at least one source of pizza sauce for conveying pizza sauce from the at least one source of pizza sauce to at least the first inlet, the conveyed pizza sauce being dispensed out of at least one of the outlets to the crust below;
    (c) a second pump in fluid communication with at least the second inlet and at least one source of pizza sauce for conveying pizza sauce from the at least one source of pizza sauce to at least the second inlet, the conveyed pizza sauce being dispensed out of at least one of the outlets to the crust below; and (d) a rotary motor disposed beneath the crust and drivingly linked to the tray for rotating the tray relative to the manifold as the pizza sauce is dispensed out of at least one of the outlets, wherein
(a) the first inlet is in fluid communication with the first pump and a first segment of the outlets;
(b) the second inlet is in fluid communication with the second pump and a second segment of the outlets;
(c) the first segment of the outlets is positioned above a first radial portion of the pizza crust that is adjacent to a center of the pizza crust; and
(d) the second segment of the outlets is positioned above a second radial portion of the pizza crust that is spaced from the center of the pizza crust.

2. The apparatus in accordance with claim 1, wherein the manifold comprises:
(a) an inlet portion having the at least first and second inlets formed therethrough;
(b) a chamber portion disposed adjacent the inlet portion, the chamber portion having at least first and second passages, each of which is aligned with a respective one of the at least first and second inlets, wherein each passage is in fluid communication with a first and second chamber defined at least by a sidewall of the chamber portion; and
(c) a detachable dispenser portion disposed adjacent the chamber portion, the dispenser portion defining the first segment of the outlets, which is in fluid communication with the first chamber and the dispenser portion also defining the second segment of the outlets, which is in fluid communication with the second chamber.

3. The apparatus in accordance with claim 2, further comprising:
(a) a third pump in fluid communication with at least a third inlet and the at least one source of pizza sauce for conveying pizza sauce from the at least one source of pizza sauce to at least the third inlet, the conveyed pizza sauce being dispensed out of at least one of the outlets to the crust below; and
(b) a fourth pump in fluid communication with at least a fourth inlet and the at least one source of pizza sauce for conveying pizza sauce from the at least one source of pizza sauce to at least the fourth inlet, the conveyed pizza sauce being dispensed out of at least one of the outlets to the crust below.

4. An apparatus for applying pizza sauce to a pizza crust, the apparatus comprising:
(a) a manifold disposed above a tray having a center and a peripheral edge, wherein the tray is configured for rotating the pizza crust when the pizza crust is resting on the tray, wherein the manifold comprises:
(i) at least first and second inlets,
(ii) at least first and second chambers that are fluidly separated,
(iii) a first segment of outlets that is positioned directly above a first radial portion of the tray adjacent the center, wherein the first chamber is in fluid communication with the first inlet and the first segment of outlets, and
(iv) a second segment of the outlets that is positioned directly above a second radial portion of the tray that is adjacent the peripheral edge, wherein the second chamber is in fluid communication with the second inlet and the second segment of outlets;
(b) a first pump in fluid communication with the first inlet and at least one source of pizza sauce for conveying the pizza sauce from the at least one source of pizza sauce to the first inlet, whereby the pizza sauce passes from the first inlet into the first chamber, and to the first segment of outlets from which the pizza sauce is dispensed to the first radial portion of the tray when the pizza crust rests on the tray;
(c) a second pump in fluid communication with the second inlet and the at least one source of pizza sauce for conveying the pizza sauce from the at least one source of pizza sauce to at least the second inlet, whereby the pizza sauce passes from the second inlet into the second chamber, and to the second segment of outlets from which the pizza sauce is dispensed to the second radial portion of the tray when the pizza crust rests on the tray; and
(d) a rotary motor drivingly linked to the tray for rotating the tray relative to the manifold as the sauce is dispensed onto the pizza crust.

5. The apparatus in accordance with claim 4, wherein the manifold comprises:
(a) an inlet portion having at least the first and second inlets formed therethrough;
(b) a chamber portion disposed adjacent the inlet portion, the chamber portion having at least first and second cavities that at least partially define the first and second chambers; and
(c) a dispenser portion disposed adjacent the chamber portion, the dispenser portion having passages formed therethrough defining the first and second segments of outlets.

6. The apparatus in accordance with claim 5, wherein the dispenser portion is removably fastened to the chamber portion, thereby permitting ready replacement.

7. The apparatus in accordance with claim 6, further comprising a second dispenser portion having passages defining third and fourth segments of outlets formed therethrough, wherein a cross-section of the first and second segments of outlets is different from a cross-section of the third and fourth segments of outlets.

* * * * *

UNITED STATES PATENT AND TRADEMARK OFFICE
CERTIFICATE OF CORRECTION

| | | |
|---|---|---|
| PATENT NO. | : 11,700,859 B2 | Page 1 of 1 |
| APPLICATION NO. | : 17/126643 | |
| DATED | : July 18, 2023 | |
| INVENTOR(S) | : Hayden Frea and James E. Grote | |

It is certified that error appears in the above-identified patent and that said Letters Patent is hereby corrected as shown below:

In the Claims

Column 14, Line 36, Claim 5:
After the word, having, insert the word --the-- and after the word, least, delete the word "the".

Signed and Sealed this
Twenty-ninth Day of August, 2023

Katherine Kelly Vidal
*Director of the United States Patent and Trademark Office*